United States Patent [19]
Feldman et al.

[11] Patent Number: 6,137,607
[45] Date of Patent: Oct. 24, 2000

[54] BROADBAND COMMUNICATIONS METHOD AND APPARATUS FOR REDUCING OPTICAL BEAT INTERFERENCE

[75] Inventors: Robert D. Feldman, Middletown, N.J.; Gordon Cook Wilson, New York, N.Y.; Thomas Huntington Wood, Holmdel, N.J.

[73] Assignee: Lucent Technologies Inc., Murray Hill, N.J.

[21] Appl. No.: 09/027,635

[22] Filed: Feb. 23, 1998

[51] Int. Cl.[7] .............................. H04J 14/02; H04B 10/00
[52] U.S. Cl. ........................ 359/125; 359/111; 359/167; 359/187; 359/161; 372/38
[58] Field of Search .................................. 359/111, 161, 359/187, 167, 118, 125; 372/38

[56] References Cited

U.S. PATENT DOCUMENTS

| | | | |
|---|---|---|---|
| 5,796,503 | 8/1998 | Junginger et al. | 359/125 |
| 5,798,858 | 8/1998 | Bodeep et al. | 359/191 |

*Primary Examiner*—Kinfe-Michael Negash
*Attorney, Agent, or Firm*—Jeffery J. Brosemer

[57] ABSTRACT

A method and apparatus for substantially reducing OBI on optical networks in which a number of source lasers operate simultaneously and the output from the lasers is subsequently combined in the network. The method involves operating the laser in burst mode such that the laser is operational only during transmission periods.

23 Claims, 1 Drawing Sheet

BROADBAND COMMUNICATIONS METHOD AND APPARATUS FOR REDUCING OPTICAL BEAT INTERFERENCE

TECHNICAL FIELD

This invention relates generally to the field of optical communications systems and in particular to a method and apparatus for reducing optical beat interference associated with broadband, fiber-to-the-home systems.

BACKGROUND OF THE INVENTION

The communications industry has been looking eagerly toward providing broadband, two-way communications to business and homes alike. Potential applications include computer networking, telephony, interactive multi-media and entertainment such as video-on-demand. Accordingly, the industry has been viewing fiber-to-the-home (FTTH) technologies as an attractive way to provide pervasive broadband communications. Advantageously, once optical fiber is installed to a user's home or business, the bandwidth can be upgraded as demand warrants without requiring the installation of new cabling and the attendant cost and disruption.

While many FTTH approaches are possible, one particularly attractive approach is described in United States Provisional Patent Application Serial No. 60/075,362 filed on Feb. 20, 1998 by the present inventors for the present assignee and incorporated herein by reference. With this FTTH approach, communications signals directed to users (downstream) are transmitted through a passive optical network (PON) and are split for distribution to a number of users as appropriate. Conversely, signals that emanate from the users are combined as they proceed upstream through the PON.

Unfortunately, however, passive optical networks that utilize combining signals may suffer from a degradation known in the art as optical-beat interference (OBI) whenever two or more output sources (lasers) operate simultaneously. The RF spectrum of OBI produced by multiple lasers at a common photodetector is substantially proportional to the convolution of the electric-field spectral densities of each operating laser. Importantly, if portions of the spectra are closely spaced in optical frequency, OBI may fall in a desired signal band.

Consequently, a need exists for methods and apparatus that reduces OBI in optical communications systems.

SUMMARY OF THE INVENTION

An advance is made over the prior art in accordance with the principles of the present invention directed to a method and apparatus for reducing OBI in optical communications systems. Accordingly, our inventive method and apparatus operates source lasers whose output is subsequently combined in a burst mode, thereby substantially reducing the occurrence of OBI.

Viewed from one aspect, the present invention is directed to a method for reducing OBI on optical networks in which a number of source lasers operate simultaneously and the output from the lasers is subsequently combined in the network. The method involves operating the laser in burst mode such that the laser is operational only during transmission periods. Further, the method provides for a sensor or optional control signal to initiate laser operation.

Viewed from another aspect, the present invention is directed to an apparatus for operating a laser in burst mode such that OBI is substantially reduced.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

Figure 1:
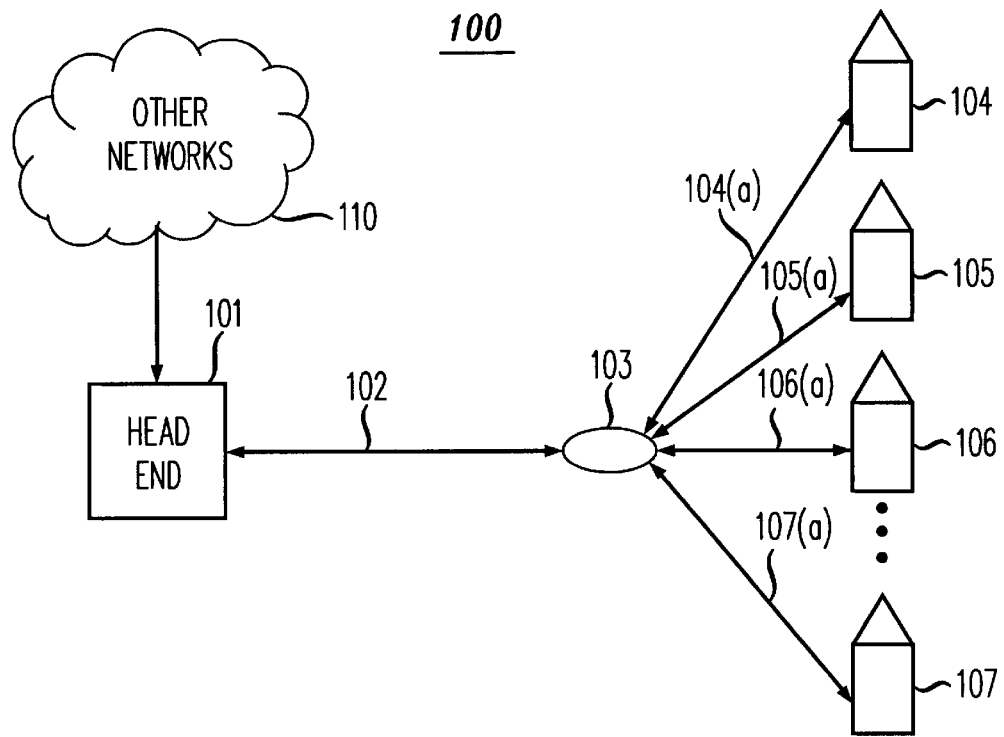
FIG. 1 is a simplified block diagram of an optical communications network suitable for the present invention.

With reference now to FIG. 1, there it shows an optical network that is subject to the OBI problems overcome by the present invention. Specifically optical network 100, which is generally a passive optical network is characterized by a headend 101 which is typically connected to another, larger network or networks 110. Generally, signals originating within the other networks 110, propagate through the headend 101 and out through optical plant 102 where it is split by splitter 103 for distribution to a number of individual subscriber premises 104–107 by way of individual subscriber access 104($a$)–107($a$). Signals originating at individual subscriber premises 104–107, are transmitted via respective individual subscriber access 104($a$)–107($a$) to combiner 103, along optical plant 102 to headend 101, for conveyance out to other networks 110. As noted previously, when the individual subscribers attempt to transmit optical signals simultaneously, OBI results with such network configurations.

While not explicitly shown in FIG. 1, our inventive method and apparatus will work with any network topology in which multiple optical signals are combined in the network medium. For example, well known bus or star topologies that use optical signaling would benefit from our invention.

Figure 2:
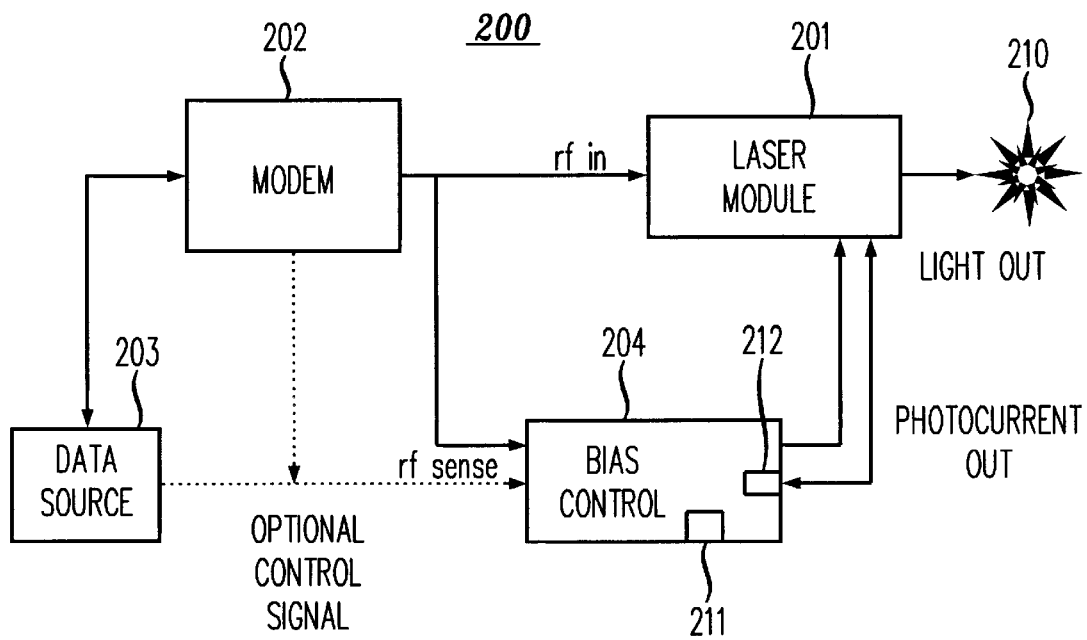
FIG. 2 is a simplified block diagram of an apparatus according to the teachings of the present invention for incorporation into the network of FIG. 1.

FIG. 2 shows in block diagram form, our inventive apparatus that overcomes OBI when using network configurations such as that of FIG. 1. Specifically, transmission apparatus 200, which generally resides in subscriber premises (104–107 of FIG. 1) is optically connected by access 210 which corresponds to one of the subscriber access lines 104($a$)–107($a$) shown previously. Accordingly, a data source 203 generates subscriber data which may modulate an rf carrier in modem 202, or alternatively be sent directly to a laser module 201 as baseband data. As is shown in the figure, the output signal of modem 202 is presented to a laser module 201 which generates laser light in response and onto access 210.

Our inventive method and apparatus substantially eliminates OBI by operating the laser in a burst mode. As can be readily appreciated by those skilled in the art, the laser should be turned on rapidly just prior to the transmission of a first bit of data and shut off rapidly shortly after the transmission of a final bit. Accordingly, bias control 204, detects the output of modem and turns on the laser 201 as the first bit of data is transmitted.

Additionally, the bias control 204 must determine in advance what an appropriate bias current should be prior to turning on the laser 201. Consequently, an appropriate bias current may be stored in local memory 211. In typical operation, the bias current will not change from burst to burst. Nevertheless, during the burst operation of the laser 201, a photocurrent out of the laser may be optionally monitored by a photocurrent monitor 212 in the bias control 204. Advantageously, if the laser power determined by such monitoring is not optimal, a new bias may be selected by the bias control 204 for biasing a subsequent burst.

At the beginning of a session, the laser 201 may be set to a default bias value. After several bursts, the bias may be advantageously varied until an optimal bias value is obtained. As should be apparent, the bias control 204 need not actively sense a signal output from the modem 202. Alternatively, a control signal output from the modem 202 or directly from data source 203 may activate the bias control 204 as well.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The invention claimed is:

1. In an optical communications network in which optical signals emitted from a plurality of sources are combined, a method of reducing optical beat interference in the combined signal comprising the steps of:

selectively un-biasing individual ones of said plurality of sources, during periods of time when the individual sources are not transmitting data, wherein said sources include a laser device and the un-biasing substantially removes any bias from the laser device such that no appreciable light is emitted from said ones; and selectively biasing individual ones of said plurality of sources by biasing a laser device such that it becomes operational and that light is emitted from particular sources only upon the initiation of a data transmission from the particular sources wherein said initiation of a data transmission is indicated by the receipt from a data source a control signal indicative of a data transmission;

such that optical beat interference in the network is substantially reduced.

2. The method according to claim 1 wherein the initiation of a data transmission is indicated by the receipt from a data source a control signal indicative of a data transmission.

3. The method according to claim 1 wherein the data source is a modem device.

4. The method according to claim 3 wherein the monitored signal is an rf signal output by the modem device.

5. The method according to claim 4 wherein the monitored signal is a baseband signal.

6. The method according to claim 1 wherein the light sources are lasers operated in a burst mode.

7. The method according to claim 6 further comprising the step of:

determining, prior to operating an individual laser in a burst mode, an appropriate bias current for the individual laser.

8. The method according to claim 7 wherein determining step comprises the step of:

reading, from a local memory, the appropriate bias current for the individual laser.

9. The method according to claim 8 further comprising the step of:

monitoring, an output power of the individual laser.

10. The method according to claim 9 further comprising the step of:

determining, an corresponding bias associated with the output power of the individual laser and storing the corresponding bias for the individual laser in the local memory.

11. In an optical communications network in which downstream optical signals are split when transmitted to one or more subscriber locations and in which upstream optical signals are combined when simultaneously sent from the subscriber locations, a method of reducing optical beat interference in the upstream signals comprising the steps of:

determining, by monitoring a signal output by a data source, the initiation of a data transmission by a data source at a subscriber location; and selectively enabling, through the action of biasing a laser such that it becomes operational at the initiation of the data transmission, an individual upstream signal from a subscriber location;

wherein an optical signal source within the subscriber locations is unbiased during periods when no data transmission is occurring such that no appreciable light is produced by the source thereby substantially reducing the optical beat interference in the communications network.

12. The method according to claim 11 wherein said monitored signal is a baseband signal.

13. The method according to claim 11 wherein said determining step further comprises the step of:

receiving, from a data source, a control signal indicative of an upstream transmission.

14. The method according to claim 11 wherein said data source is a modem device.

15. The method according to claim 14 wherein the monitored signal is an rf signal output by the modem device.

16. The method according to claim 15 wherein the selectively enabling step comprises the step of operating a signal laser in a burst mode.

17. The method according to claim 16 further comprising the step of:

determining, prior to operating the signal laser in a burst mode, an appropriate bias current for the laser.

18. The method according to claim 17 wherein said determining step further comprises the step of reading, from a local memory, the appropriate bias current for the laser.

19. The method according to claim 18 further comprising the step of:

monitoring, an output power of the laser.

20. The method according to claim 19 further comprising the step of:

determining, an corresponding bias associated with the output power and storing the corresponding bias in the local memory.

21. In an optical communications network in which optical signals emitted from a plurality of sources are combined, an apparatus for reducing optical beat interference in the combined signal comprising:

a means for generating an optical signal within each subscriber location, said generating means including:

a means for un-biasing a light source during periods when no data transmission is occurring such that no appreciable light is emitted from the light source;

a means for monitoring a cover output from the light source;

a means for determining when data transmission is occurring; and a means for biasing the light source in response to the determination that data transmission is occurring such that light is emitted from the light source upon such biasing;

wherein no appreciable light is emitted from the optical signal generating means during periods when no data transmission is occurring and that appreciable light is emitted only when no data transmission is occurring and that appreciable light is only emitted from the generating means during periods of data transmission thereby reducing the optical beat interference.

22. The apparatus according to claim 21 wherein said generating means further comprises:

a means for determining, an appropriate bias of the light source based upon the monitored power output.

23. The apparatus according to claim 22 wherein said generating means further comprises:

a means for storing the appropriate bias of the light source.

* * * * *